G. E. HENRY.
TROLLEY WHEEL.
APPLICATION FILED NOV. 17, 1911.
1,043,103.
Patented Nov. 5, 1912.
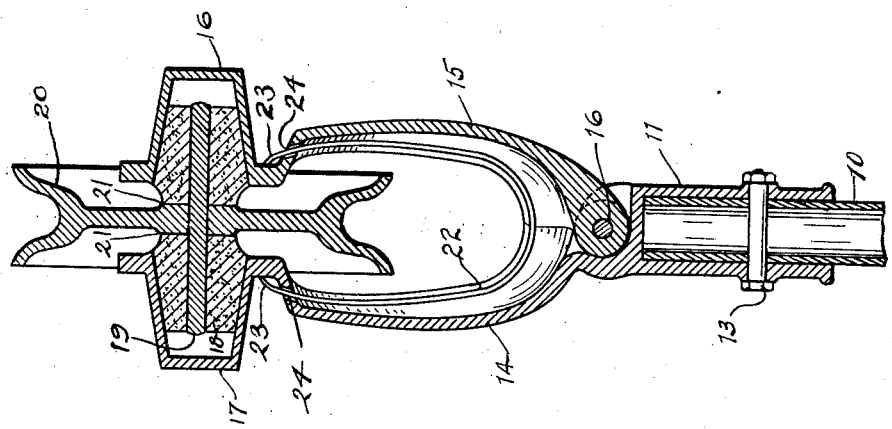
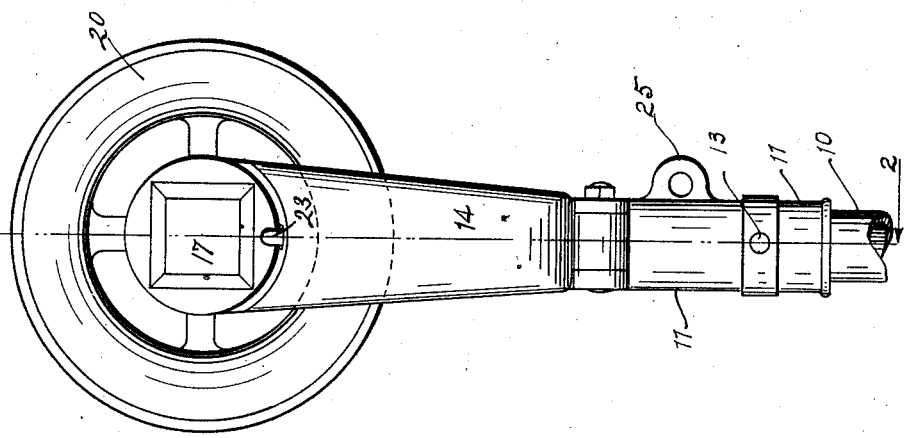
WITNESSES:
INVENTOR.
George E. Henry
BY
ATTORNEY.

UNITED STATES PATENT OFFICE.

GEORGE E. HENRY, OF VINCENNES, INDIANA.

TROLLEY-WHEEL.

1,043,103.  Specification of Letters Patent.  Patented Nov. 5, 1912.

Application filed November 17, 1911. Serial No. 660,925.

*To all whom it may concern:*

Be it known that I, GEORGE E. HENRY, a citizen of the United States, and a resident of Vincennes, county of Knox, and State of Indiana, have invented a certain useful Trolley-Wheel; and I do hereby declare that the following is a full, clear, and exact description thereof, reference being had to the accompanying drawings.

The object of this invention is to provide an improved trolley mounting for trolley cars or other purpose which will lengthen the life of the trolley and provide a means for conducting the electric current from the trolley wire to the trolley arm and thence to the car.

This invention constitutes an improvement over a former one for which a patent was granted August 15, 1905, No. 797,355.

The principal features of the improvement are a spindle integral with the trolley wheel having bearings in tapering blocks of a nature which require no lubrication, and which are spring pressed against the hub of the wheel whereby all of the wear of the bearings will be taken up, the wheel kept in alinement and perfect electric conductivity maintained between the trolley wire and the trolley arm. With such construction also, the trolley wheel cannot wabble and this is an important result.

The nature of the invention will be understood from the accompanying drawings and the following description and claims.

In the drawings, Figure 1 is a side elevation of a trolley wheel and its mountings with a portion of the rod broken away. Fig. 2 is a longitudinal section on the line 2—2 of Fig. 1.

In detail there is shown a trolley pole 10 with a harp 11 secured at its upper end by a bolt 13 extending therethrough. This harp, in contrast to the common form of harp, has only one side member 14 integral with the base portion 11, the other portion 15 being hinged to the base portion at 16. The upper ends 17 of the harp members are formed to receive bearing blocks 18 for the spindle 19 of the trolley wheel 20 and rigidly secured therewith. Said bearing boxes 17 are hollow and in shape are frustums of pyramids with their axes extending at right angles to the axis of the trolley arm and coinciding with the axis of the spindle 19 and with the tapered or pyramidal sides extending from the spindle ends toward the periphery of the wheel and with their inner or enlarged portions open to receive the bearing blocks 18. Said blocks, composed of a graphitic substance, are of a shape to fit the interior of the bearing boxes 17 with a hole through their centers to receive the trolley spindle 19 and having a flattened inner end 21 adapted to bear against the hub of the trolley wheel and keep it in alinement. As the bearing faces 21 wear, the lost motion is taken up by the spring 22. This spring, rectangular in cross section, has its lower portion lying inside the harp below the wheel and transversely thereof and with the ends 23 extending through holes 24 in the harp members 14 and 15 and bearing against the outside walls of the same immediately below the bearing boxes 17, as seen in Fig. 1. Thus the bearing boxes 17 are pressed inwardly and will in turn, press the graphite bearing blocks 18 against the hub of the wheel and take up the wear at 21 and at the same time maintain perfect electric conducting means. An ear 25 on the member 11 furnishes means for securing the trolley rope to said harp.

Inasmuch as the spindle is rigidly secured to the wheel and the bearings bear against the hub of the wheel as well as support the spindle, and under the action of the spring 22 the bearing boxes constantly force the bearings against the hub of the wheel about the spindle, and since the bearings fit snugly in the bearing boxes, there is no chance for the wheel to wabble, and this great difficulty in the construction of trolley wheels is overcome and their life is greatly prolonged. Also, with this arrangement all the expense of lubrication is entirely saved, and the graphite bearing blocks are good electrical conductors.

I claim as my invention:

1. The combination of a trolley wheel, a harp having a pair of upwardly extending members with opposed tapering bearing boxes, electrically conducting tapering bearings for said wheel, and resilient means acting on said harp members tending to force the bearing boxes toward each other.

2. The combination of a trolley wheel, a harp having a pair of upwardly extending members hinged together at their lower ends and having opposed pyramidal bearing boxes, electrically-conducting pyramidal bearings for said wheels, and a spring acting on said harp members so as to force the bearing boxes toward each other.

3. The combination of a trolley wheel, a spindle therefor, electrically-conducting tapered bearings for said wheel and spindle which abut against the opposite sides of the wheel, a harp having a pair of yieldingly hinged members carrying opposed tapering boxes in which said tapering bearings fit, and means tending to force the members of the harp toward each other so that the wear between the bearing and the wheel will be taken up.

4. The combination of a trolley wheel, a spindle rigidly secured thereto, a harp having a pair of movably hinged members with opposed tapering bearing boxes, electrically conducting pyramidal bearings for said wheel and spindle, and a spring tending to force the bearing boxes toward each other, whereby the wheel will be prevented from wabbling.

In witness whereof, I have hereunto affixed my signature in the presence of the witnesses herein named.

GEORGE E. HENRY.

Witnesses:
G. H. BOINK,
O. M. McLAUGHLIN.

Copies of this patent may be obtained for five cents each, by addressing the "Commissioner of Patents, Washington, D. C."